July 3, 1956 W. A. WIGHT 2,753,030
CLUTCH APPARATUS
Filed Oct. 28, 1952 3 Sheets-Sheet 1

INVENTOR.
William A. Wight.
BY
Thiess, Olsen & Mecklenburger
Attys.

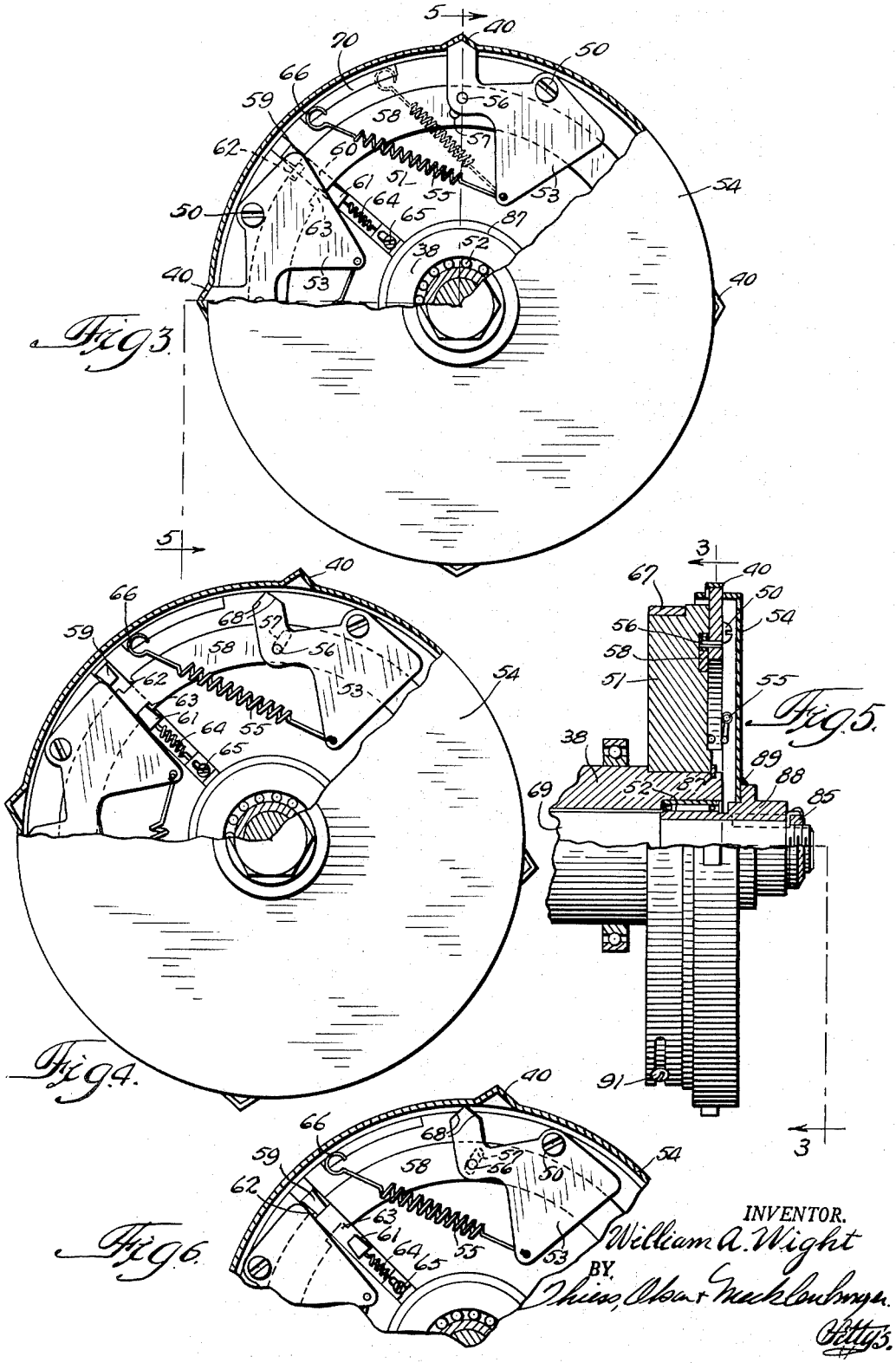

July 3, 1956 W. A. WIGHT 2,753,030
CLUTCH APPARATUS
Filed Oct. 28, 1952 3 Sheets-Sheet 3

INVENTOR.
William A. Wight
BY
Thiess, Olsen & Mecklenburger
Attys

United States Patent Office 2,753,030
Patented July 3, 1956

2,753,030

CLUTCH APPARATUS

William A. Wight, Hinsdale, Ill., assignor to Janette Electric Mfg. Co., Morton Grove, Ill., a corporation of Michigan Application October 28, 1952, Serial No. 317,299

14 Claims. (Cl. 192—103)

This invention relates to valve and control apparatus and more particularly to power-operated valve and control apparatus.

It is a principal object of this invention to provide improved valve and control apparatus.

It is another object of this invention to provide improved apparatus in which a gate valve can be operated between open and closed positions by manual or power-driven means.

It is a further object of this invention to provide improved apparatus whereby a sudden torque may be applied to rotate a valve driving means to overcome any standing friction resulting from the various parts having been in fixed positions for a period of time.

It is a further object of the invention to provide apparatus which will establish a predetermined seating force between a valve and a valve seat.

It is an additional object of this invention to provide control apparatus having a high starting torque and a predetermined seating force in which the parts are readily accessible for easy maintenance and in which no excessive fatiguing forces will be applied to the apparatus when the engaging parts are seated.

Apparatus heretofore used in the power operation of valve mechanisms has generally been cumbersome and designed in a manner making the parts generally inaccessible. This inaccessibility is especially characteristic of resilient members provided for tensioning the valve stem when the valve is in the seated position. Therefore, it is a further object of this invention to provide improved valve control apparatus in which the seating springs are readily available for maintenance and replacement.

It is a further object of this invention to provide control apparatus in which seating springs are fixed in the apparatus whereby operation of the mechanism will not necessitate rotation of these resilient members.

Another object of this invention is to provide a power driving means in which said means will not engage the driven apparatus until the associated prime mover has attained a predetermined speed.

It is a further object of this invention to provide such power means in which the prime mover will be disengaged from an associated load whenever the load exhibits a predetermined torque to said prime mover, and this disengagement will be maintained until the prime mover has been de-energized and the speed of the driving member has been substantially reduced and subsequently increased to a predetermined magnitude.

It is a further object of this invention to provide clutch means in which a plurality of engaging elements mounted on a driving member will engage a driven member whenever the driving member attains a predetermined speed and will maintain engagement with the driven member until said driven member reflects a predetermined resistive torque to said driving elements.

Other objects of this invention will become manifest from a consideration of the specification, accompanying drawings, and appended claims.

One form which this invention may assume includes an induction type electric motor adapted to drive the engaging portions of a speed and torque sensitive clutch. The driven portions of such a clutch will, through an appropriate gearing arrangement, engage a rotatable splined thrust nut which is internally threaded to engage a coaxial valve stem. The valve stem, correspondingly threaded, will be fixed to prevent rotation thereof but capable of axial movement with respect to the thrust nut and driving means. Thus when it is desired to operate the associated valve mechanism, the electric motor will be energized, and upon reaching a predetermined speed, the associated clutch mechanism will be actuated. This engagement will cause rotation of the thrust nut through the associated driving mechanism, and rotation of the nut will cause extension of the valve stem and consequent closure of the valve. Upon reaching its extended position, the valve will engage a valve seat to prevent further motion thereof, and at this instant the thrust nut member which is splined to its associated driving means continues to rotate and climbs the threaded valve stem, thus compressing a resilient seating spring. The compression of this spring will reflect an increasing torque back into the prime mover and clutch, and when this torque exceeds a predetermined magnitude the torque sensitive clutch mechanism will be deactuated and retained in the deactuated position until the prime mover has been stopped and once again actuated to reach the first predetermined speed.

While the apparatus herein described utilizes compression springs to provide a predetermined seating force, the use of the clutch and control apparatus herein described is not limited to such a seating means. The clutch may be utilized with a valve having a positive stop, and will then disengage upon the abrupt increase in torque resulting from valve seating.

For a more complete understanding of the invention reference should now be made to the accompanying drawings, in which:

Fig. 3 is an illustration, partially in section taken along line 3—3 of Fig. 5, of a preferred embodiment of a clutch mechanism adapted for valve operation, shown in the engaged position;

Fig. 4 illustrates the clutch mechanism of Fig. 3 wherein the actuating members are shown in a deactuated position for speeds and torques above the predetermined values;

Fig. 5 is a side view of the clutch mechanism of Fig. 3 taken in section along the line 5—5;

Fig. 6 is a partial view corresponding to the portions of Fig. 3 shown in section in which the positions of the various actuated elements are those assumed before a predetermined speed is attained;

Figure 1:
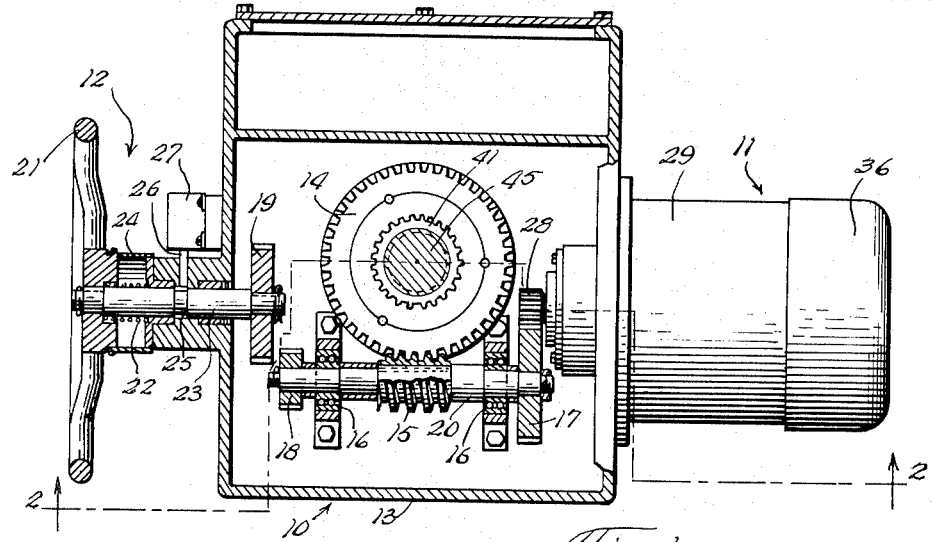
Figure 1 is a plan view, partially in section, of the manual and power driving mechanisms of one embodiment of this invention.

Referring now to the drawings, and more particularly to Fig. 1, a valve mechanism 10 is provided with a prime mover 11 and a manual operating mechanism 12. The valve mechanism 10 comprises a housing 13 in which a driving worm gear 14 is rotatably mounted. A mechanism for driving the gear 14 consists of a worm 15 engaging the gear 14 and mounted on the shaft 20 which is, in turn, rotatably mounted in the housing 13 on ball bearings 16. Also secured to the shaft 20 is a power-driven gear 17 and a manually-driven gear 18. The manually-driven gear 18 is engageable by an associated gear 19 which is axially shiftable for driving engagement by depression of the handle 21 against the force of a spring 22. Gear 19 and handle 21 are keyed to a common shaft 23 which is rotatably mounted in the housing 13. A protective cover 24 is provided to avoid any damage to the spring 22, and also to avoid hazards to operators who might otherwise be injured by depressing the handle 21.

Shaft 23 has a reduced portion 25 which is engageable by a solenoid-operated pin 26. This pin 26 is extended by energizing the solenoid 27, which is adapted to be energized whenever the power actuated portions of this device are being utilized. Thereby a device is provided whereby the manual portion 12 will be locked to prevent driving engagement with gear 18 when the power driven portion 11 is energized. This interlocking feature is desirable to prevent injury to the manual portions of the apparatus and also to prevent injury to operators.

The power driven gear 17 is continuously engaged by a gear 28 which is driven ultimately by the prime mover 29. As shown more clearly in Fig. 2, the gear 28 is secured to a shaft 34 which is rotatably mounted in bearings 31 in a detachable portion 32 of the housing 13. Thereby the entire power driving portions of the apparatus may be removed by the removal of mounting bolts 33 for easy replacement or maintenance. The shaft 34 terminates in the driven element 35 of the clutch mechanism 36. The driven element 35 consists of a cylindrical shell having a plurality of indentations or notches therein adapted to receive the driving elements, as will be explained subsequently. The driving member 37 of the clutch 36 is mounted on a hollow shaft 38 concentric with the driven shaft 34. Shaft 38 is supported by bearings 39 and has the rotating portions of the motor 29 secured thereto. This arrangement of coaxial shafts is provided so that the clutch mechanism is easily accessible by the removal of the cover plate 30. This greatly facilitates any maintenance operation on the clutch parts.

When either the manual or power driving portions of this apparatus is actuated, the worm gear 14 is rotated. As the worm gear 14 is rotated, it rotatably drives the thrust nut 41 which is splined thereto. The thrust nut 41 is movable in the housing 13 and is rotatably mounted in the axially movable support 42 by bearing 47. Support 42 has secured thereto a plurality of coil springs 43 which are fixed in a cover plate 44 removably secured to the housing 13. Thus there is no rotation about the axis of the thrust nut 41 of either the spring members 43 or the support 42. Rotation of the thrust nut 41 in the appropriate direction will cause axial movement of the valve stem 45 to effect operation of the valve; that is, to effect valve closure, the valve stem 45 will move in a direction indicated by the arrow 46. Upon closure of the valve, the stem 45 and its associated gate mechanism will engage a fixed stop in the valve which will prevent further axial motion of the stem 45. Thus, as rotation of the thrust nut 41 causes relative axial movement of the nut and the stem 45, the nut 41 will begin to rise, exerting a force through the bearings 47 and the supporting member 42 to compress the springs 43. Compression of the springs 43 will be reflected into the prime mover 29 and clutch mechanism 36 as an increasing torque, and upon a predetermined compression of the springs 43, a torque sufficient to cause disengagement of the clutch 36 will be present and will release the prime mover 29. The motor is then de-energized by either manual or automatic means and the valve will thus remain closed under the force of compressed springs 43.

To open the valve, the motor is energized for rotation in the opposite direction, and as all of the driving elements and the clutch elements are bidirectional, the above-described operation may be repeated, opening the associated valve by lifting the valve stem 45 until a limit switch is engaged, at which time the motor will be de-energized and the apparatus will come to rest in the open position.

To provide a completely sealed housing a cover 48 is provided which will allow the necessary travel of the stem 45 within the housing. An integral unit is thus provided which will have the desirable features of easy accessibility of all of the operating portions with accompanying simplification of the operating mechanism over that previously known in the art. In addition, by providing a speed sensitive clutch adapted to engage only when the motor 29 has attained a predetermined speed, the inertia of the motor 29 will provide a sudden accelerating force which is desirable and sometimes necessary to overcome the standing friction of the various rotating parts. If the motor and operating mechanism were continuously engaged, the standing friction of the various rotating parts would often be sufficient to prevent power operation of the apparatus and would necessitate manual starting. By utilizing the above-described system of clutch engagement, satisfactory starting characteristics are attained with a relatively small motor.

For a better understanding of the clutch portions of this invention reference should be made to Fig. 3, wherein a driving member 51 is shown secured to the hollow shaft 38 which is rotatably mounted on bearings 39. The rotatable portions of the motor 29 are also secured to the shaft 38. Pivotally mounted on this driving member are a plurality of driving elements 53. In this embodiment four such driving elements have been utilized, but for various applications and embodiments any number might be found desirable. The driving elements 53 are pivotally mounted on pins 50 and so constructed and positioned that there will be substantially no rotating moment about the point 50 resulting from centrifugal force. The driving elements 53 are urged into engagement with notched portions 40 of a driven member 54 by associated adjustable coil springs 55.

The springs 55 are adjustable in the driving member 51 between the positions illustrated in Fig. 3 as solid and broken lines. The springs 55 engage semicylindrical pins 66 which are integral with an adjustable ring 67. The ring 67 extends around the full circumference of the driving member 51 and is held in the proper position by a setscrew 91, as best shown in Fig. 5. The pins 66 extend from the ring 67 through apertures 70 into the plane of the driving elements 53.

The driving elements 53 have pins 56 extending therefrom. Each of these pins extends through a diagonal slot 57 in a synchronizing ring 58, and this synchronizing ring is provided primarily to assure coincidental movement of all of the driving elements. It is desirable that all of the elements engage the driven member 54 at precisely the same time, and to assure this the synchronizing ring 58 is provided.

A slidably mounted stop member 60 is provided having stops 59 and 61 to engage associated slots 62 and 63 in the synchronizing ring. For motor speeds, and consequently driving member speeds, less than a predetermined magnitude, the clutch elements will assume the positions shown in Fig. 6. Under such speed conditions the tension spring 64 has urged the stop pin 59 into engagement with slot 62 to prevent relative rotation of the synchronizing ring 58 with respect to the driving member 51 on which it is rotatably mounted. Thus the driving elements 53 are maintained in the deactuated position by the engagement of the pins 56 in the slots 57 of the synchronizing ring 58 and cannot engage the driven element 54. As the speed of the driving member 51 approaches the predetermined speed at which engagement is desired, the centrifugal force acting upon the stop member 60 will approach the retaining force of the coil spring 64. The coil spring 64 is pretensioned by the adjustment of setscrew 65 to provide this equality of forces at any desired speed. When the centrifugal force acting on stop member 60 is sufficient, the stop 59 will be extended against the spring 64 and will leave the slot 62. When this occurs the springs 55 will cause driving elements 53 to rotate about pins 50 and will cause counterclockwise rotation of synchronizing ring 58 with respect to the driving member 51. Thus, all of the driving elements 53 will engage the notches 40 of the driven member 54, and torque will be transmitted from the prime mover to the valve apparatus. This will drive the valve apparatus and cause the valve to be actuated.

When the valve engages its fixed stop, the seating springs 43 will be compressed as described above, and will exhibit to the prime mover a rapidly increasing torque. This large torque will cause the driving elements 53 to be ejected from the associated notches 40 of the driven element 54. The shape of the notches 40, and the corresponding shape of the engaging surfaces 68 of the driving element 53, is one of the variables which will determine the exact torque at which the radial force will be sufficient to eject the driving element from the notches 40. The torque magnitude which will cause disengagement is also a function of the tension in the adjustable spring 55 and the variable torque arm. This ejection will produce motion of the driving elements 53 to the full extent allowed by the pins 56 traveling in the slots 57 of the synchronizing ring 58.

When this torque is present and consequently the driving elements are ejected, the synchronizing ring 58 will be rotated slightly in the clockwise direction by the engagement of the pins 56 in the associated slots 57, as shown best in Fig. 4. This rotation of the synchronizing ring will align the slot 63 in the ring with the stop 61, and because of the centrifugal force acting on the stop member 60, the stop 61 will engage the slot 63. Under these conditions, the synchronizing ring 58 cannot return to its actuated position in which the driving elements 53 would engage the associated notches 40.

The clutch driving elements 53 will remain in the positions illustrated in Fig. 4 until the prime mover is de-energized and the speed of the driving member 51 is reduced. As the driving member speed is reduced, the tension spring 64 will again produce a force sufficient to overcome the centrifugal force of the stop member 60 and will thus withdraw the stop 61 from the slot 63. At the same time the spring 64 will have drawn the stop 59 toward the center of the driving member against the centrifugal force of the stop member 60, and thus the stop 59 will engage the smooth surface of the synchronizing ring 58. When the stop 61 has been withdrawn from the slot 63, the springs 55 will cause the synchronizing ring to rotate slightly in the counterclockwise direction relative to the driving member 51, and as the stop 59 is engaged with the synchronizing ring 58 it will slip into the slot 62 after a small rotation of the synchronizing ring and will thus prevent further rotation. Under such conditions the elements are in the positions illustrated by Fig. 6 and will remain thus until the prime mover is once again energized and the sequence of operations above described will be repeated. The frictional engagement of the stop 61 in the slot 63 will prevent its withdrawal at the precise speed at which the centrifugal force is equal to the spring tension. Thus when the frictional force is overcome, the stop member 60 will quickly move to a position in which the stop 59 will engage the slot 62.

The driving member 51 is forced on the hollow driving shaft 38 and retained in the proper position by the retaining ring 87. Hollow driving shaft 38 rotates with respect to the driven shaft 69 through bearing 52. A collar 88 is keyed to the driven shaft 69 and is retained thereon by the locking nut 85. The driven element 54 is in turn attached to the collar 88 by any appropriate means, such as by a weld 89.

Figure 7:
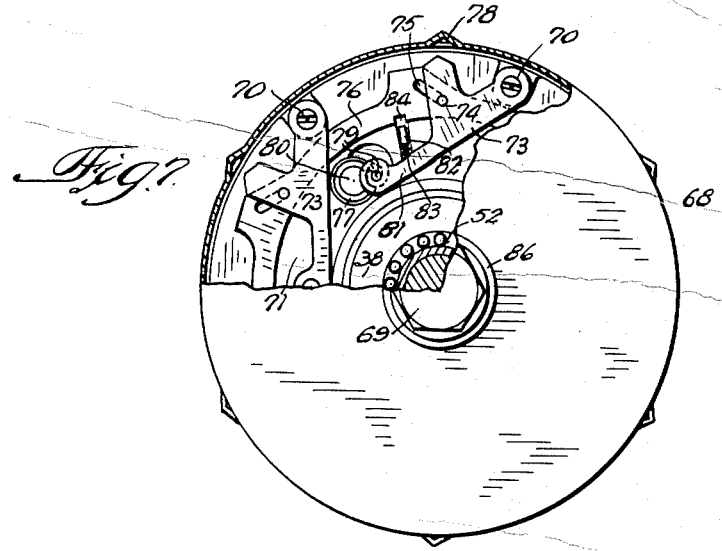
Fig. 7 illustrates a second embodiment of the clutch mechanism of this invention, shown partially in section taken along line 7—7 of Fig. 9 and showing the driving elements in a deactuated position.

Referring now to Fig. 7, a second clutch embodiment is shown. This embodiment includes a driven member 68 secured to a collar 86 which is keyed to the shaft 69 for rotation therewith. The driving member 71 is keyed to the shaft 38 which is coaxially mounted with the driven shaft 69 on the bearings 39. The driving member 71 has a plurality of driving elements 73 pivotally mounted at one end on pins 70 which are secured to the driving member 71. Thereby the driving elements will be readily forced outward by centrifugal force, the magnitude of such force being determined by the speed of the driving member. As in the embodiment described above, these driving elements have pins 74 extending therefrom and engaging elongated diagonal slots 75 in a synchronizing ring 76. This arrangement of pins, slots, and synchronizing ring will insure coincidental engagement of the driving elements with the driven member 68.

Figure 9:
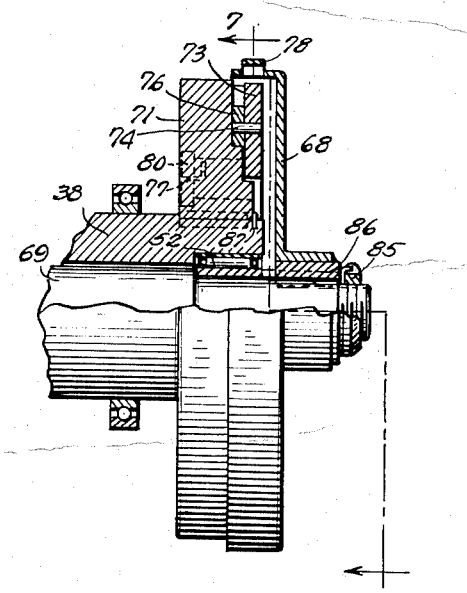
Fig. 9 is a side view, partially in section, of the embodiment of Fig. 7.

The driving member speed at which the driving elements will move outward radially is determined by the retarding force imposed by coil spring 77 on the extended arm 81 of the driving member 73 and the pin 79 extending therefrom. The pin 79 engages the several turns of the coil spring 77 and operates as a toggle member whereby the spring 77 will retain the driving element 73 in the de-actuated position until a predetermined driving member speed is attained. At this predetermined speed of the driving member, the driving elements 73 will have sufficient centrifugal force to overcome the retaining force of the spring 77 and will shift to the engaged position in which they will drivingly engage notches 78 in the driven member 68. Upon shifting to the driving position wherein the driving elements 73 engage the notches 78, the coil spring 77 acts in a manner which will maintain this position with a predetermined force. Spring 77 is mounted adjustably on a rotatable pin 80, as best shown in Fig. 9, whereby this exact tension can be determined. When the valve member is seated, a large torque is exhibited to the driving member, as described above, and this torque will produce a radial force on the driving elements 73 toward the center of the driving member which will become sufficient to cause disengagement of the driving elements 73 from the corresponding notches 78. The exact torque necessary to cause this disengagement is again determined by the design and choice of the coil spring 77 and the shape of the notches 78.

Figure 8:
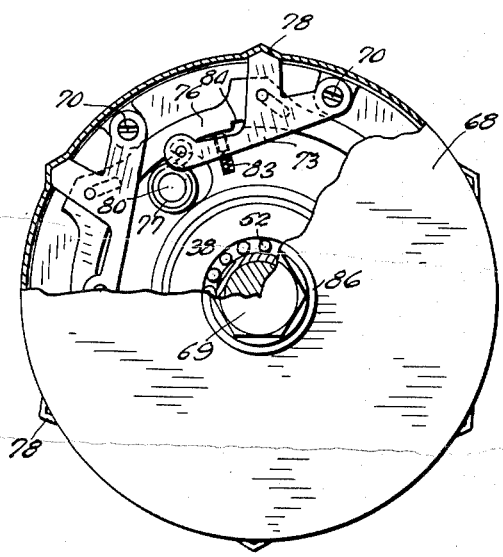
Fig. 8 illustrates the embodiment of Fig. 7 wherein the driven elements are in the actuated position.

Fig. 7 illustrates the positions of the various clutch elements at speeds less than the predetermined speed for clutch engagement, and Fig. 8 illustrates the position of the various clutch elements after this predetermined speed has been attained and the clutch driving elements 73 are engaging the corresponding notches 78. At this time the synchronizing ring 76 has been rotated slightly in a clockwise direction relative to the driving member whereby all of the driving elements have moved simultaneously.

When the valve reaches the full extent of its travel, as described above, the torque transmitted by the clutch is substantially increased, and this increased torque will cause a radial force on the driving elements 73. This inward force on the driving elements 73 will be more than sufficient to overcome the force of spring 77 and will cause the elements 73 to move to the disengaged position. A lockout pin 82 is provided to maintain the driving elements 73 in the disengaged position once the predetermined torque has been experienced. This lockout pin 82 is drawn toward the center of the driving member by a tensioned coil spring 83, and as the driving member attains its optimum speed, the centrifugal force acting upon the lockout member 82 becomes sufficient to overcome the force of spring 83 and cause lockout pin 82 to move radially outward. However, the spring 83 is so chosen that the lockout pin 82 will not be substantially extended before the driving elements 73 have moved to the engaged position. Therefore, as shown in Fig. 8, the notch 84 in the synchronizing ring 76 will have shifted so that upon extension of the lockout pin 82 it will be stopped in its motion by contact with the smooth edge of the synchronizing ring 76. However, when the seating torque is experienced by the driving elements they will be forced radially inward, causing counterclockwise motion of the synchronizing ring 76. This counterclockwise motion will be sufficient to align the slot 84 with the lockout pin 82 whereby the centrifugal force acting on said lockout pin will cause it to engage the slot 84. Therefore the synchronizing ring 76 will be locked against further relative rotation with respect to the driving member and will thus prevent re-engagement of the driving elements 73 with the notches 78. It is desirable to maintain the elements 73 in the deactuated position to prevent excessive wear and fatigue on the notches and driving elements and to prevent continued driving of the valve mechanism which would result from intermittently applied force on the notches.

In the side view of this clutch shown in Fig. 9, the manner in which the driving and driven members are oriented is more clearly shown. The driven member 68 is there shown secured to collar 86 which is in turn keyed to a shaft 69 and held by a lock nut 85. The hollow shaft 38 which is connected to the motor armature is mounted on bearings 39 coaxially with the driven shaft 69. Secured to the hollow shaft 38 is the driving member 71, and pivotally mounted on the driving member 71 are the driving elements 73. The driving elements 73 are pivotally mounted at one end and have a pin 74 engaging the slot 75 in the synchronizing ring 76 as described above. The notches 78 in the driven member are here formed by a machine operation punching out a portion of the flange of the driven member, but may be of various forms without departing from the invention.

Thus a clutch is provided which will be disengaged when the driving member is at speeeds less than a predetermined magnitude and will positively engage when such magnitude is reached. This will provide a relatively large staring torque where small prime movers such as induction motors are utilized. Additionally, the clutches herein provided will automatically release when a predetermined torque is exhibited and will lock in the released position so that the driving elements will not be damaged or fatigued by continued chattering or attempted engagement once the predetermined torque has been attained. The deactuating torques may be chosen independently for the two directions of rotations by the appropriate shape of the respective surfaces of the notches 78.

In the clutch embodiment of Figs. 7, 8, and 9, both the speed at which engagement will occur and the torque at which the clutch elements are deactuated are controlled by the pretensioning of spring 79. In designing the clutch to meet certain valve requirements in a particular situation, the shape of the notch in the driven member, which determines the deactuating torque independently, will be selected to produce the desired clutch characteristics with a predetermined relationship between pick up speed and deactuation torque.

The embodiment of Figs. 3, 4, 5, and 6 provides independent means for adjusting the speed at which the clutch engages and the maximum transmitted torque. The tensioning of spring 64, which is adjustable by setscrew 65, determines the speed at which the members engage, and the tensioning of spring 55 by relative rotation of the ring 67 determines the torque at which the clutch is deactuated.

Figure 2:
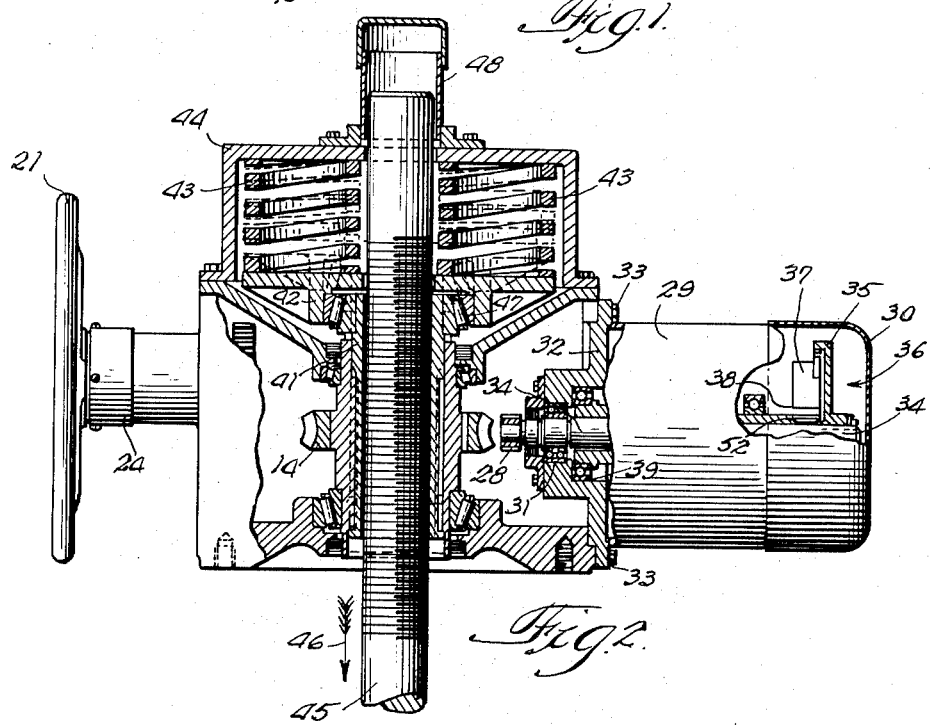
Fig. 2 is a side view taken along the plane 2—2 of Fig. 1.

By assembling this clutch mechanism in valve apparatus such as shown in Figs. 1 and 2, a new power driven valve closing means is provided in which it is possible to overcome large starting torques which may result in intermittent valve operation and also will provide a predetermined seating force by the compression of coil springs 43. When this seating force has been applied to the valve stem 45, the clutch will be automatically disengaged and will not chatter or damage any of the parts of either the prime mover, clutch, or valve operating mechanism.

While one particular arrangement of driving means for this valve operating mechanism and two types of clutch have been here provided, it should be clear that any desired type of power means might be provided to operate the valve mechanism in Figs. 1 and 2. The various inherent advantages of this valve operating structure would still be present irrespective of the type of driving means utilized. The valve operating mechanism herein described provides a seating force from a plurality of springs which are fixed and non-rotatable and are mounted in a supplementary housing separable from the valve housing for easy maintenance and replacement. The coaxial mounting method for the prime mover and clutch provides additional advantage in ease of maintenance and replacement of those elements.

It is also clear to one skilled in the art that there are many applications to which the clutch mechanisms herein taught might be applied, and the clutches herein taught are in no way limited to use in valve operating devices though some desirable results herein described result from this combination.

While the operation of this mechanism has been generally described where the valve mechanism is closing the valve gate, it should be clear that because of the shape of the driving elements 73 and associated notches 78, the clutch mechanism is bidirectional and will be equally effective in operation in the reverse direction. Therefore, it is clear that the mechanism will operate equally well for opening or closing the valve which is connected to the stem 45. A limit switch is provided to deenergize the motor when the valve is opened. A fixed stop may be provided whereby upon opening the valve and drawing the valve stem 45 into the housing, a predetermined torque would also be exhibited to cause disengagement of the clutch mechanism when the valve is completely open.

Without further elaboration, the foregoing will so fully explain the gist of my invention that others may, by applying current knowledge, readily adapt the same for use under varying conditions of service, while still retaining one or more features, which may properly be said to constitute the essential items of novelty involved, which items are intended to be defined and secured to me by the following claims.

I claim:

1. A clutch for operatively connecting a prime mover to a load, said clutch comprising a rotatable driving member, a rotatable driven member substantially coaxial with said driving member, engaging means mounted on said driving member and radially movable with respect to the axis of said driving member between a neutral and a driven member-engaging position, means mounted on said driving member to retain said engaging means in said neutral position for all speeds of said driving member less than a predetermined magnitude, means mounted on said driven member to move said engaging means to said neutral position when said driven member exhibits a predetermined resistance torque to said driving member, and locking means to retain said engaging means in said neutral position for all speeds of said driving member above a second predetermined magnitude.

2. A clutch for transmitting torque comprising a rotatable driving member, a rotatable driven member substantially coaxial with said driving member, engaging means mounted on said driving member and radially movable with respect to the axis of said driving member between a neutral and a driven member-engaging position, locking means mounted on said driving member to maintain said engaging means in said neutral position for all speeds of said driving member less than a predetermined magnitude, and means to move said engaging means to said neutral position in response to transmitted torque exceeding a predetermined maximum.

3. A clutch comprising a rotatable driving member, a rotatable driven member substantially coaxial with said driving member, speed-responsive engaging means mounted on said driving member movable from a neutral to a driven member-engaging position when said driving member is accelerated to a predetermined speed, said engaging means engaging said driven member along surfaces forming a substantial angle to the direction of movement of said engaging means whereby said engaging means will be forced to said neutral position by torque in excess of a predetermined maximum exerted on said driven member by said engaging means, and a lockout device to maintain said engaging means in the neutral position after said predetermined torque is exceeded and until the speed of said driving member is reduced to a value less than said predetermined speed whereby said speed-responsive engaging means is rendered effective.

4. A clutch for operatively connecting a load to a prime mover, said clutch comprising a rotatable driving member, a rotatable driven member substantially coaxial with said driving member, a plurality of driving elements pivotally secured to said driving member, each of said elements being pivotable about an axis substantially parallel to the common axes of said driving and driven members between a neutral position and a driven member-engaging position, retaining means mounted on said driving member for retaining said driving elements in their respective neutral positions, adjustable means mounted on said driving member for resiliently retaining said driving elements in their respective actuated positions, the driving member speed at which said driving elements move from said neutral position to said actuated position being predetermined by the centrifugal force acting on said retaining means, a synchronizing ring rotatably mounted on said driving member and slidably connected to each of said driving elements and rotatably movable thereby when said driving elements move between said neutral position and said actuated positions whereby said ring assures simultaneous movement of said driving elements, said driving elements engaging said driven member along surfaces forming a substantial angle with the direction of pivotal movement of said driving elements whereby said driving elements may be forced out of driving engagement with said driven member by a predetermined maximum torque exerted on said driven member by said driving elements, and lockout means mounted on said driving member for locking said driving elements in said neutral positions, said lockout means being centrifugally operated at said predetermined driving member speed and locking said driving elements in said neutral positions when said maximum torque is exceeded, said lockout means being frictionally engageable in locking position whereby said lockout means is retained in locking position for a predetermined range of speeds of said driving member below said predetermined speed.

5. A clutch for operatively connecting a valve to valve drive means to transmit a substantial predetermined seating pressure to the valve from such valve drive means and to cause the clutch to disengage when such predetermined pressure is exceeded, said clutch comprising a driving member and a driven member rotatable about substantially common axes, a plurality of driving elements pivotally secured to said driving member, each of said elements being pivotable with respect to said driving member about an axis substantially parallel to said common axes between a neutral position and an actuated position in which said elements drivingly engage said driven member, a synchronizing ring rotatably mounted on said driving member and slidably connected to each of said driving elements and movable thereby when said driving elements move between said neutral positions and said actuated positions whereby said synchronizing ring assures simultaneous movement of said driving elements, resilient means adjustably mounted on said driving member and urging said driving elements into driving engagement with said driven member, and radially movable centrifugally operated locking means resiliently urged into engagement with said synchronizing ring for speeds of said driving member less than a predetermined magnitude and centrifugally urged into engagement with said ring for speed in excess of a second predetermined magnitude, said locking means engaging said ring to maintain said driving elements in said neutral position, said driving elements engaging said driven member along surfaces forming a substantial angle with the direction of pivotal movement of the driven member-engaging portions of said elements whereby said driving elements may be forced out of driving engagement with said driven member by a predetermined maximum torque exerted on said driven member by said driving member.

6. A clutch for operatively connecting a valve to valve drive means whereby a substantial predetermined seating pressure is applied to the valve which in turn causes the clutch to disengage, said clutch comprising a driving member and a driven member rotatable about substantially common axes, a plurality of driving elements pivotally secured to said driving member, each of said elements being pivotable with respect to said driving member about an axis substantially parallel to said common axes between a neutral position and an actuated position in which said elements drivingly engage said driven member, said driving elements being movable from said neutral positions to said actuated positions when said driving member attains a predetermined speed, a synchronizing ring slidably connected to each of said plurality of driving elements and movable thereby when said driving elements move between said neutral positions and said actuated positions whereby said synchronizing ring assures simultaneous movement of said plurality of driving elements, said driving elements engaging said driven member along surfaces forming a substantial angle with the direction of pivotal movement of the driven member-engaging portions of said driving elements whereby said driving elements may be forced out of driving engagement with said driven member and into said neutral position by a predetermined maximum torque exerted on said driven member by said driving elements, and a lockout device mounted on said driving member for locking said driving elements substantially in said neutral positions, said lockout device being centrifugally operated and being operative to lock said driving elements in said neutral position when the speed of said driving member is at least said first-mentioned predetermined speed, said lockout device being frictionally engageable in locking position whereby said lockout device is retained in locking position when the speed of said driving member is within a range of values below said predetermined speed.

7. A clutch for operatively connecting a valve to valve drive means, said clutch comprising a driving member and a driven member rotatable about substantially common axes, a plurality of driving elements pivotally secured to said driving member, each of said driving elements being pivotable with respect to said driving member about an axis substantially parallel to said common axes between a neutral position and an actuated position in which said driving element drivingly engages said driven member, means mounted on said driving member for resiliently retaining said plurality of driving elements in their respective actuated positions, said driving elements being movable from said neutral positions to said actuated positions when said driving member rotates at a predetermined speed, a synchronizing ring slidably connected to each of said driving elements and movable thereby when said driving elements move between said neutral positions and said actuated positions whereby said synchronizing ring assures simultaneous movement of said plurality of driving elements, said driving elements engaging said driven member along surfaces forming a substantial angle with the direction of pivotal movement of the driven member-engaging portions of said elements whereby said driving elements may be forced out of driving engagement with said driven member by a predetermined maximum torque exerted on said driven member by said driving elements, and a lockout device mounted on said driving member for locking said driving elements substantially in said neutral positions, said lockout device being centrifugally operated and being initially operative to lock said driving elements when said driving member rotates at a predetermined speed in excess of said first-mentioned predetermined speed, said lockout device being frictionally engageable in locking position whereby said lockout device is retained in locking position when the speed of said driving member is within a range of values below said first-mentioned predetermined speed.

8. A clutch for operatively connecting a load to a prime mover, said clutch comprising a driving member and a driven member rotatable about substantially common axes, a plurality of driving elements pivotally secured to said driving member, each of said elements being pivotable with respect to said driving member about an axis substantially parallel to said common axes between a neutral position and an actuated position in which said element drivingly engages said driven member, retaining means mounted on said driving member for retaining said driving elements in their respective neutral positions, resilient means to retain said driving elements in their respective actuated positions, said driving elements being movable from said neutral positions to said actuated positions by said resilient means when said driving member rotates at a predetermined speed to release said retaining means, a synchronizing ring slidably connected to each of said driving elements and movable thereby when said driving elements move between said neutral positions and said actuated positions whereby said synchronizing ring assures simultaneous movement of said driving elements, said driving elements engaging said driven member along surfaces forming a substantial angle with the direction of pivotal movement of the driven member-engaging portions of said elements whereby said driving elements may be forced out of driving engagement with said driven member by a predetermined maximum torque exerted on said driven member by said driving elements, and a lockout device mounted on said driving member for locking said driving elements substantially in said neutral positions, said lockout device being centrifugally operated and being operative to lock said driving elements when the speed of said driving member is of a predetermined value in excess of said first-mentioned predetermined speed and said maximum torque is exceeded to cause said driving elements to move to said neutral position, said lockout device being frictionally engageable in locking position whereby said locking device is retained in locking position when the speed of said driving member is within a range of values below said first-mentioned predetermined speed.

9. A clutch for operatively connecting a load to a prime mover, said clutch comprising a driving member and a driven member rotatable about substantially common axes, driving means pivotally secured to said driving member, said means being pivotable with respect to said driving member about an axis substantially parallel to said common axes between a neutral position and an actuated position in which said means drivingly engages said driven member, resilient means mounted on said driving member for resiliently retaining said driving means in the actuated position, stop means to retain said driving means in the neutral position against the force of said resilient means, said driving means being movable from said neutral position to said actuated position by said resilient means when said driving member rotates at a predetermined speed whereby said stop means is released, a synchronizing ring slidably connected to said driving means and movable thereby when said driving means moves between said neutral position and said actuated position whereby said synchronizing ring assures simultaneous movement of said driving means, said driving means engaging said driven member along surfaces forming a substantial angle with the direction of pivotal movement of the driven member-engaging portions of said driving means whereby said driving means may be forced out of driving engagement with said driven member by a predetermined maximum torque exerted on said driven member by said driving means, and a lockout device mounted on said driving member for locking said driving means substantially in said neutral position, said lockout device being centrifugally operated and being operative to lock said driving means when the speed of said driving member is of a predetermined value in excess of said first-mentioned predetermined speed, said lockout device being frictionally engageable in locking position whereby said lockout device is retained in locking position when the speed of said driving member is within a range of values below said first-mentioned predetermined speed.

10. A clutch for operatively connecting a valve to valve drive means whereby a substantial predetermined seating pressure is applied to the valve by said drive means which in turn causes the clutch to disengage, said clutch comprising a driving member and a driven member rotatable about substantially common axes, a plurality of driving elements pivotally secured to said driving member, each of said elements being pivotable with respect to said driving member about an axis substantially parallel to said common axes between a neutral position and an actuated position in which said element drivingly engages said driven member, means mounted on said driving member for retaining said driving elements in their respective neutral positions for speeds less than a predetermined value, said driving elements being movable from said neutral positions to said actuated positions when said driving member rotates at said predetermined speed, means to assure simultaneous movement of said driving elements between said neutral positions and said actuated positions, said driving elements engaging said driven member along surfaces forming a substantial angle with the direction of pivotal movement of the driven member-engaging portions of said driving elements whereby said driving elements may be forced out of driving engagement with said driven member and to said neutral position by a predetermined maximum torque exerted on said driven member by said driving elements, and a lockout device mounted on said driving member for locking said driving elements substantially in said neutral positions, said lockout device being centrifugally operated to lock said driving elements in said neutral position when the speed of said driving member is of a predetermined value in excess of said first-mentioned predetermined speed, said lockout device being frictionally engageable in locking position whereby said lockout device is retained in locking position when the speed of said driving member is within a range of values below said first-mentioned predetermined speed.

11. A clutch for operatively connecting a valve to valve drive means to transmit a substantial predetermined seating pressure to the valve from said drive means and to cause the clutch to disengage when such predetermined pressure is exceeded, said clutch comprising a driving member and a driven member rotatable about substantially common axes, a plurality of driving elements pivotally secured to said driving member, each of said elements being pivotable with respect to said driving member about an axis substantially parallel to said common axes between a neutral position and an actuated position in which said element drivingly engages said driven member, means mounted on said driving member for retaining said driving elements in their respective neutral positions for speeds less than a predetermined value, said driving elements being movable from said neutral positions to said actuated positions when said driving member rotates at said predetermined speed, said driving elements engaging said driven member along surfaces forming a substantial angle with the direction of pivotal movement of the driven member-engaging portions of said elements whereby said driving elements may be forced out of driving engagement with said driven member and to said neutral position by a predetermined maximum torque exerted on said driven member by said driving elements, and a lockout device mounted on said driving member for locking said driving elements substantially in said neutral positions, said lockout device being centrifugally operated to lock said driving elements in said neutral position when the speed of said driving member is of a predetermined value in excess of said first-mentioned predetermined speed, said lockout device being frictionally engageable in locking position whereby said lockout device is retained in locking position when the speed of said driving member is within a range of values below said first-mentioned predetermined speed.

12. A clutch for operatively connecting a load to a prime mover, said clutch comprising a rotatable driving member, a rotatable driven member substantially coaxial with said driving member, a plurality of driving elements pivotally secured to said driving member, each of said elements being pivotable about an axis substantially parallel to the common axes of said driving and driven members between a neutral position and a driven member-engaging position, adjustable means mounted on said driving member for resiliently retaining said driving elements in their respective actuated positions, a synchronizing ring rotatably mounted on said driving member and slidably connected to each of said driving elements and rotatably movable thereby when said elements move between said neutral positions and said actuated positions whereby said ring assures simultaneous movement of said driving elements, said driving elements engaging said driven member along surfaces forming a substantial angle with the direction of pivotal movement of said driving elements whereby said driving elements may be forced out of driving engagement with said driven member by a predetermined maximum torque exerted on said driven member by said driving elements, retaining means mounted on said driving member for engaging said synchronizing ring to retain said driving elements in their respective neutral positions, the driving member speed at which said driving elements move from said neutral position to said actuated position being determined by centrifugal force acting on said retaining means, and lockout means mounted on said driving member for locking said driving elements in said neutral positions, said lockout means being centrifugally operated at said predetermined speed to engage said synchronizing ring, said lockout means being frictionally engageable in locking position whereby said lockout means is retained in locking positions for speeds substantially less than said predetermined speed, said synchronizing ring being shaped to receive said retaining means and said lockout means whereby said lockout means is prevented from engaging said synchronizing ring in locking engagement for increasing driving member speeds, and whereby said retaining means will engage said synchronizing ring to maintain the deactuated positions of said driving elements for decreasing driving member speeds.

13. A clutch for transmitting torque comprising a rotatable driving member, a rotatable driven member substantially coaxial with said driving member, engaging means mounted on said driving member and radially movable with respect to the axis of said driving member between a neutral and a driven member-engaging position, locking means mounted on said driving member to maintain said engaging means in said neutral position for all speeds of said driving member less than a predetermined magnitude and urge said engaging means to said driven member-engaging position for all speeds greater than said predetermined magnitude, and means to move said engaging means to said neutral position in response to transmitted torque exceeding a predetermined maximum.

14. A clutch for transmitting torque comprising a rotatable driving member, a rotatable driven member substantially coaxial with said driving member, engaging means mounted on said driving member and movable between a neutral and a driven member-engaging position, locking means sensitive to centrifugal force mounted on said driving member to maintain said engaging means in said neutral position for all speeds of said driving member less than a predetermined magnitude and urge said engaging means to said driven member-engaging position for all speeds greater than said predetermined magnitude, and means to move said engaging means to said neutral position in response to transmitted torque exceeding a predetermined maximum.

References Cited in the file of this patent

UNITED STATES PATENTS

| Re. 20,471 | Kelty | Aug. 17, 1937 |
| 865,556 | Andersen | Sept. 10, 1907 |
| 1,586,393 | Astrom | May 25, 1926 |
| 1,681,487 | Lee et al. | Aug. 21, 1928 |
| 1,745,738 | Carter | Feb. 4, 1930 |
| 1,843,194 | Banker | Feb. 2, 1932 |
| 2,088,581 | Barnes et al. | Aug. 3, 1937 |